March 7, 1961  F. A. GREENAWALT  2,973,644
EXPANSIBLE POWER ELEMENT
Filed July 15, 1959

INVENTOR:
FREDERICK A. GREENAWALT.
BY
ATTORNEY.

United States Patent Office 2,973,644
Patented Mar. 7, 1961

2,973,644

EXPANSIBLE POWER ELEMENT

Frederick A. Greenawalt, Fort Lauderdale, Fla., assignor to Ranco Incorporated, Columbus, Ohio, a corporation of Ohio Filed July 15, 1959, Ser. No. 827,299

1 Claim. (Cl. 73—368.3)

The present invention relates to an expansible power element of the type containing a fluid and having a part which moves in response to changes in volume of the fluid for actuating instruments, such as indicators or control devices.

It has been proposed heretofore to provide expansible power elements of the type mentioned comprising an elastic tubular member containing a fluid which expands and contracts and which member is confined against radial expansion by a rigid sleeve structure to cause elongation and shortening of the tubular member by expansion and contraction of the fluid to thereby actuate an instrument operatively connected with one end of the tubular member. These elements are unsatisfactory for certain uses due to friction between the elastic material and the rigid confining structure which results in excessive wear and inaccuracy in the instrument operating movements of the elastic member so that the life of the element is relatively short and the instrument operated hereby does not correspond accurately to changes in volume of the fluid in the member. This problem is aggravated in most cases because a solid liquid fill must be employed which results in an exceedingly high pressure inside the tubular member, as in the order of twenty-five hundred pounds per square inch.

A general object of the present invention is the provision of a power element of the type mentioned having an improved structure for confining the elastic tubular member against radial expansion in a manner which is free of friction between the member and its confining structure, resulting in a greatly increased life and a high degree of consistent and accurate instrument actuating movements which correspond closely to changes in volume of fluid inside the tubular member.

In carrying out the invention, a fluid containing elastic tubular member is provided having the sides thereof encircled by a multiplicity of closely spaced, ring-like, relatively rigid elements arranged in concentric relationship with the tubular member, the inner surfaces of which are bonded to the material of the tubular member, so that the elements compositely present a confining wall non-yieldable radially but yet offering relatively slight resistance to elongation forces applied to the tubular member from within, whereby increases in fluid volume inside the elastic member are reflected wholly in elongation of the tubular member. The radial expansion of the tubular member is prevented by providing a sufficient number of narrow ring-like elements that the total normal elongation of the tubular member results in separation of the individual ring-like elements of such slight degree that the material bonded to the ring-like members cannot flow outwardly between the elements by reason of this slight separation and the bond between the material of the elongated member and the inner surfaces of the elements. The ring-like elements may comprise the convolutions of a coiled wire spring or they may comprise relatively closely spaced thin metallic washers. Preferably, in the form of the invention employing a coiled wire spring to confine the tubular member, the ends of the spring extend beyond the portions of the tubular member subjected to elongation and encircle rigid cylindrical members of approximately the same diameter as the outside diameter of the tubular member.

Other objects and advantages of the invention will be apparent from the following description of preferred embodiments thereof, reference being made to the accompanying drawings wherein, Fig. 1 is a sectional view of an expansible power element embodying the invention which may be used to actuate an instrument, such as a switch, not shown, for controlling the operation of a refrigerating system.

Figure 1:
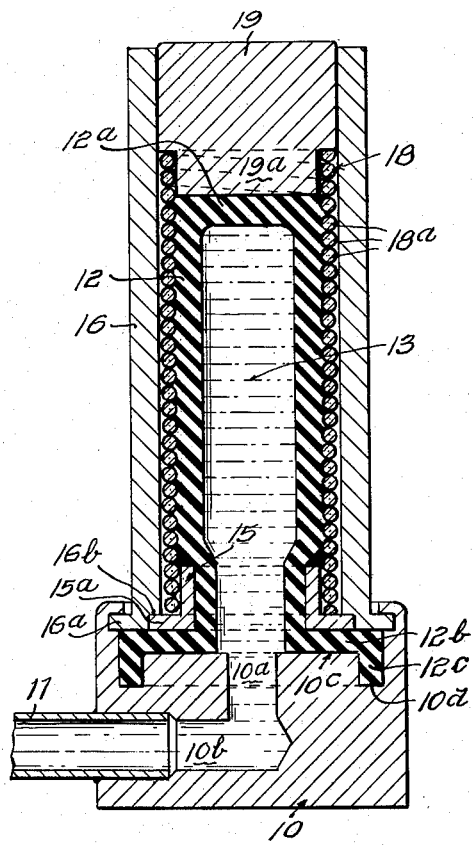
Figure 2:
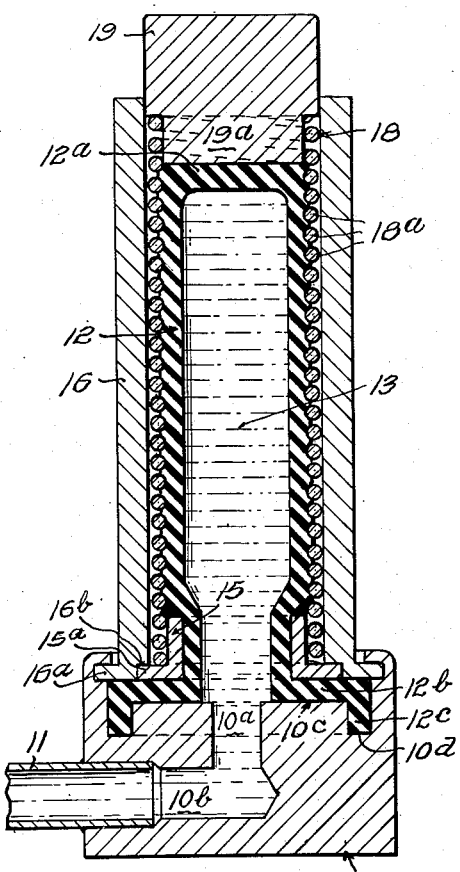
Fig. 2 is a view similar to Fig. 1, but showing certain parts of the power element in another position.
Figure 3:
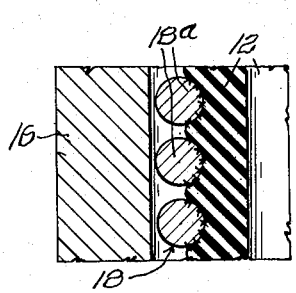
Fig. 3 is a fragmentary sectional view of a part of the power element shown in Figs. 1 and 2 but on a larger scale.

In the form of the invention shown in Figs. 1 to 3, the power element comprises a base 10, formed of a cylindrical metal body having an axial bore 10a connected by a cross-bore 10b, as shown. A small diameter tube 11 is attached as by brazing in bore 10b, and the outer end of this tube, not shown, is sealed.

An elastic, tubular member 12, closed at one end by a wall 12a, is attached to base 10 so that its interior is in communication with tube 11 through bores 10a and 10b, and the member, bores and tube are completely filled with a liquid 13 to provide a "solid" liquid fill. Tubular member 12 is formed of elastic material which is impervious to liquid 13, and such material is an artificial rubber known as Buna-N and comprising a copolymer of 98% isobutylene and 2% isoprene. To effect attachment of member 12 to base 10, the lower end of the member, as viewed in the drawings, is open and has a radially extending flange 12b which rests on surface 10c, and an annular, axially projecting flange 12c on flange 12b that fits within a groove 10d. Flanges 12b and 12c are pressed into the positions described by flanges 15a and 16a formed on a collar 15 and a sleeve 16, respectively, both of which are relatively rigid and formed of metal. Flange 16a is undercut at 16b to receive the peripheral edge of flange 15a and it also projects beyond the edge of flange 12b. The upper portions of the two sides of body 10 are turned and pressed against the edge of flange 16a, as shown, thereby causing member 12 to be attached to base 10 by a liquid-tight, non-yielding seal.

Sleeve 16 extends beyond the upper end of member 12 and the diameter of its inside is greater than the diameter of the outsides of the member so as to provide space therebetween for a coiled spring 18, the purpose of which spring is described more fully hereinafter. The upper end of sleeve 16 receives and guides a cylindrical plunger 19 which is preferably formed of metal and serves to transmit movement of the end wall 12a to whatever instrumentality is to be actuated by the power element, such as a refrigerator control switch in the example mentioned. The plunger proper has a sliding fit with the sleeve walls but the lower end portion 19a thereof is of reduced diameter so that the sides of this section are aligned with the outer surfaces of the sides of member 12, and the upper end of spring 18 encircles and grips portion 19a of the plunger, as shown. It is to be understood that a suitable load is maintained on plunger 19 so as to cause the plunger to tend to cause contraction of elastic member or when the fluid pressure therein decreases.

Spring 18 is preferably formed of a relatively porous metal, such as brass, so that the high pressure of liquid 13 causes the material forming the walls of member 12 to flow and enter the pores to become bonded to the convolutions 18a of the spring which encircle the member. The diameter of the wire forming spring 18 is relatively small so that a large number of convolutions encircle elastic member 12 throughout its length beyond collar 15, and the normal range of elongation of the elastic member causes but a slight separation of the adjacent convolutions 18a which prevents any appreciable tendency of the material of the member to flow outwardly therebetween, although the internal pressure may be as high as twenty-five hundred pounds per square inch. The bonding of the material of member 12 to the convolutions 18a and the limited separation of the convolutions assure complete containment of the member against radial expansion so that the entire expansion of liquid 13 is reflected to elongation of the elastic member. Preferably, the convolutions of spring 18 touch one another when member 12 is at its normally retracted position and the volume of liquid acting on the tubular member is limited so that total elongation of that member is controlled to a normal degree which maintains separation between the convolutions 18a at a minimum while permitting an appreciable total elongation of the elastic member. Friction between the elastic material of member 12 and the spring convolutions during elongation and shortening of the member is completely absent, and the spring convolutions shield the walls of the expansible member from direct engagement with sleeve 16 so that frictional wear on the surfaces of the member is impossible. A suitable lubricant, such as graphite, is preferably coated on sleeve walls so that friction from longitudinal movements of member 12 and convolutions 18a is substantially nil, thereby providing a high degree of accuracy and consistency in operation of the power element.

Figure 4:
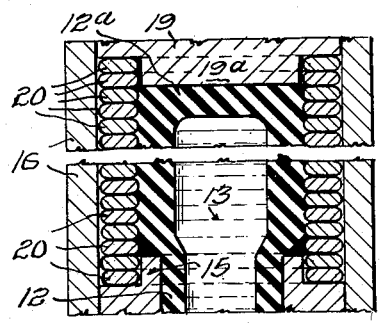
Fig. 4 is a fragmentary, sectional view of a second form of the invention.

Referring to the form of the invention shown in Fig. 4, the power element shown is like that of the embodiment just described, except that a series of rings 20, concentric with the tubular member 12, have been substituted for spring 18; otherwise, like parts of the two embodiments bear the same reference characters. Rings 20 are preferably of a relatively porous metal, such as brass, and are stamped from thin stock so that a multiplicity of closely spaced confining surfaces to which the sides of member 12 may be bonded are provided. The rings, being of metal, are relatively inexpansible so as to contain the elastic member 12 against radial expansion. The rings separate readily when the liquid in member 12 expands, thereby forcing such expansion to elongation only. It is apparent that the rings function similarly to the convolutions 18a of spring 18 to protect the member from wear and to provide a minimum of friction.

It will be seen that by providing narrow ring-like elements surrounding the elastic member and causing adjoining elements to engage when the elastic member is non-extended, a relatively large number may be employed whereby a substantial elongation of the elastic member results in but a slight separation between adjoining ring-like elements, which effectively prevents radial flow or expansion of the sides of the member. The separation between each element will be the fraction of the extent of elongation arrived at by dividing the number of elements less one, into the total elongation.

While but two forms of the invention have been shown and described, it is to be understood that other forms, modifications and adaptations could be embodied, all falling within the scope of the claim which follows.

I claim:

An expansible power element comprising, an elongated elastic tubular member closed at one end, a base member, means sealingly attaching the other end of said tubular member to said base member, a collar surrounding said tubular member adjacent to said base member, a coiled wire spring surrounding the sides of said tubular member and at least a portion of said collar and in concentric relation with said tubular member and collar, means bonding the material of said tubular member with the inner surfaces of the convolutions of said spring, a rigid sleeve surrounding said spring and tubular member, said sleeve having a smooth cylindrical interior surface and a substantial section extending beyond said closed end of said tubular member, a plunger guided in said section of said sleeve and engaging the closed end of said tubular member, said spring extending beyond said closed end of said tubular member and surrounding a portion of said plunger, and a body of liquid contained by said tubular member.

References Cited in the file of this patent

UNITED STATES PATENTS

| | | |
|---|---|---|
| 16,428 | Allen | Jan. 20, 1857 |
| 118,755 | Spooner | Sept. 5, 1871 |
| 1,340,846 | Veenschoten | May 18, 1920 |